(12) United States Patent
Aoyama et al.

(10) Patent No.: US 10,265,762 B2
(45) Date of Patent: Apr. 23, 2019

(54) CAST-IN STRUCTURE AND CAST-IN MOLD FOR VEHICLE COMPONENT

(71) Applicants: Ahresty Corporation, Toyohashi-shi, Aichi (JP); Yorozu Corporation, Yokohama-shi, Kanagawa (JP)

(72) Inventors: Shunzo Aoyama, Toyohasi (JP); Yasushi Kanno, Toyohasi (JP); Masaharu Matsumoto, Tochigi (JP); Sadahiro Sekine, Tochigi (JP)

(73) Assignee: Yorozu Corporation, Yokohama (JP)

( * ) Notice: Subject to any disclaimer, the term of this patent is extended or adjusted under 35 U.S.C. 154(b) by 247 days.

(21) Appl. No.: 15/145,025

(22) Filed: May 3, 2016

(65) Prior Publication Data

US 2016/0318097 A1 Nov. 3, 2016

Related U.S. Application Data

(62) Division of application No. 14/368,324, filed as application No. PCT/JP2012/082722 on Dec. 18, 2012.

(30) Foreign Application Priority Data

Dec. 27, 2011 (JP) .................................. 2011-286365

(51) Int. Cl.
*B22D 19/04* (2006.01)
*B22D 17/24* (2006.01)
(Continued)

(52) U.S. Cl.
CPC ........... *B22D 19/04* (2013.01); *B22D 17/002* (2013.01); *B22D 17/22* (2013.01); *B22D 17/24* (2013.01);
(Continued)

(58) Field of Classification Search
CPC ........ B22D 19/00; B22D 19/04; B22D 17/22; B22D 17/24
(Continued)

(56) References Cited

U.S. PATENT DOCUMENTS

| 1,535,350 | A | 4/1925 | Stacy |
| RE26,126 | E | 12/1966 | Buschow |
| 7,862,059 | B2 | 1/2011 | Ko |

FOREIGN PATENT DOCUMENTS

| EP | 2100679 A1 | 9/2009 |
| JP | S55-149764 | 11/1980 |

(Continued)

OTHER PUBLICATIONS

International Search Report for PCT/JP2012/082722 dated Jan. 29, 2013.
(Continued)

*Primary Examiner* — Kevin P Kerns
(74) *Attorney, Agent, or Firm* — Drinker Biddle & Reath LLP

(57) ABSTRACT

A projection of burr is provided by forming an appropriate gap to set a cast-in member to a cast-in mold, completely closing the gap when the cast-in mold is clamped, and correcting cast-in positioning (axis mating) to a die-cast component by a clamping operation of the die-cast mold, regardless of a dimensional precision of the cast-in member upon a manufacture. Steel plate cast-in member 2, wrapped cast except for a bonding portion 2b to a steel plate bonding member 3 upon molding a die-cast component 1, has a mold contact portion 4 at a boundary between a cast-in portion 2a wrapped cast with a die-cast component 1 and the bonding portion 2b. When a cast-in mold A is clamped, the mold contact portion 4 is brought into butting contact with the (Continued)

cast-in mold A, gap S between the cast-in member 2 and the cast-in mold A, cavity a, is closed.

2 Claims, 12 Drawing Sheets

(51) Int. Cl.
| | |
|---|---|
| *B60G 21/05* | (2006.01) |
| *B22D 17/22* | (2006.01) |
| *B22D 19/00* | (2006.01) |
| *B32B 15/01* | (2006.01) |
| *B22D 17/00* | (2006.01) |

(52) U.S. Cl.
CPC ............ *B22D 19/00* (2013.01); *B32B 15/012* (2013.01); *B32B 15/013* (2013.01); *B60G 21/051* (2013.01); *B60G 2200/20* (2013.01); *B60G 2200/21* (2013.01); *B60G 2206/20* (2013.01); *B60G 2206/202* (2013.01); *B60G 2206/81012* (2013.01); *Y10T 428/12972* (2015.01)

(58) Field of Classification Search
USPC .................................................... 164/98, 112
See application file for complete search history.

(56) References Cited

FOREIGN PATENT DOCUMENTS

| | | | | |
|---|---|---|---|---|
| JP | 63031204 | U | 2/1988 | |
| JP | 10-52738 | A * | 2/1998 | ............... B22C 9/24 |
| JP | 10-85921 | A * | 4/1998 | ............ B22D 19/00 |
| JP | 11255170 | A | 9/1999 | |
| JP | 2010194583 | A | 9/2010 | |
| JP | 2010221222 | A | 10/2010 | |
| WO | WO-2006/044713 | A2 | 4/2006 | |
| WO | WO-2009/106326 | A1 | 9/2009 | |
| WO | WO-2011088554 | A1 | 7/2011 | |

OTHER PUBLICATIONS

European Search Report dated Apr. 22, 2015 for corresponding EP Patent Application No. 12861935.0.

* cited by examiner (a)

(b)

(a)

(b)

(a)

(b)

(a)

(b)

(a)

(b)

CAST-IN STRUCTURE AND CAST-IN MOLD FOR VEHICLE COMPONENT

CROSS-REFERENCE TO RELATED APPLICATIONS

This application is a divisional application of U.S. patent application Ser. No. 14/368,324, abandoned, filed Jun. 24, 2014, which is a national stage application (under 35 U.S.C. § 371) of PCT/JP2012/082722, filed Dec. 18, 2012, which claims benefit of Japanese Application No. 2011-286365, filed Dec. 27, 2011, both of which are incorporated herein by reference in their entirety.

TECHNICAL FIELD

The present invention relates to a cast-in structure for a cast-in member and a cast-in mold, and more particularly to a cast-in structure for a steel plate cast-in member and a cast-in mold, the cast-in member being wrapped cast except for a bonding portion bonded to a bonding member upon molding a die-cast component, when the die-cast component casted by using a light alloy metal such as aluminum and a steel plate bonding member are bonded to each other, i.e., when different kind of metals are bonded to each other.

BACKGROUND ART

When a member made of a light alloy metal such as aluminum, magnesium, or zinc and a member made of an iron steel (iron metal), i.e., members made of different kind of metals, are directly welded and bonded to each other, a weak intermetallic compound is formed between both members (on a bonding interface). Therefore, a weld crack is generated, resulting in that reliability in bonding strength (weld strength) is deteriorated. This has conventionally been known.

As a method of solving the problem of deterioration in the reliability of the bonding strength caused by the direct weld bonding between the members made of different kind of metals, a cast-in structure (cast enclosing structure) has been proposed (for example, see patent literature 1). In the cast-in structure, a cast-in member (joint member) made of a material same as a steel plate bonding member (steel member) that is to be welded and bonded is integrally wrapped cast and bonded upon molding an aluminum die-cast component.

In the patent literature 1, the deterioration in the bonding strength by the direct weld between the members made of different kind of metals and the difficult welding between aluminum members are avoided, and the aluminum die-cast component can be bonded to the steel plate bonding member (steel member) made of a different kind of metal via the steel plate cast-in member (steel joint member) that can be welded and bonded without any troubles. Specifically, since the bonding member and the cast-in member are both made of steel plate, both members are bonded by welding with sufficient bonding strength without any troubles, and the aluminum die-cast component can be bonded by welding to the steel plate bonding member that is made of a different kind of metal.

In the cast-in structure for the cast-in member that is wrapped cast to an aluminum die-cast component only at the cast-in portion of the steel plate cast-in member with the bonding portion bonded to the steel plate bonding member by welding being left (except for the bonding portion bonded to the steel plate bonding member by welding), when a molten metal is casted in a die-cast mold, a so-called cavity, burr (casting burr) is likely to project toward the bonding portion of the cast-in member exposed to the outside from the cast aluminum die-cast component. Therefore, a countermeasure against the projection of burr has to be taken.

A gap needed to set the cast-in member to the die-cast mold by a fitting method of fitting the cast-in member to the die-cast mold is formed in a space between the cast-in member and the die-cast mold. Therefore, a countermeasure against the projection of burr from the gap has to be required.

The gap of settings between the cast-in member and the die-cast mold is inevitable for promptly setting the cast-in member to the die-cast mold by means of a carrier device such as a robot hand. On the other hand, a dimensional error due to plastic deformation (plastic strain) is likely to occur on the cast-in member manufactured by machine working such as press working. A cast-in member that is formed into a cylinder having a rectangular (oblong) or elliptic cross-section by bending process is particularly likely to have a dimensional error due to plastic deformation. In addition, it is difficult to perform a process for maintaining high dimensional precision. Therefore, burr is likely to project.

When the burr (casting burr) projects up to the bonding portion of the cast-in member bonded to the steel plate bonding member by welding, the projecting burr might cause deterioration in bonding strength to the bonding member.

When it is supposed that the aluminum die-cast component, to which the steel plate cast-in member made of different kind of metal from the aluminum die-cast component is wrapped cast and bonded, is used for a body component or a suspension component of a vehicle that is used under severe environment where the component is easy to be corroded, galvanic corrosion generated between the cast-in member and the aluminum die-cast component, which are made of different kind of metals, becomes a problem. As a countermeasure against the galvanic corrosion, there have been proposed a method of providing an insulating material for preventing the galvanic corrosion between the cast-in member and the aluminum die-cast member, and a method of applying a seal material for preventing water content from entering the gap on the cast-in portion wrapped cast with the aluminum die-cast member. However, these methods cannot prevent the galvanic corrosion due to the projecting burr, resulting in that the effect of these methods is deteriorated.

CITATION LIST

Patent Literature

Patent Literature 1: JP-2010-194583 A (see [0026] to [0036], FIG. 4(b), and the like)

SUMMARY OF INVENTION

Technical Problem

In the prior art described in the patent literature 1, the structure of preventing the projection of burr generated when the steel plate cast-in member is wrapped cast upon molding the aluminum die-cast component is a dam formed by an acceleration of solidification of a molten metal, by cooling, on a step formed on the cast-in member (joint member) wrapped cast with the aluminum die-cast component. This structure cannot prevent the projection of burr with reliability.

Specifically, in this prior art, the gap needed to set the cast-in member to the die-cast mold is not completely closed after the die-cast mold is clamped, but still present in a curved (bent) shape as illustrated in FIG. 4(b). Therefore, the molten metal cast in the cavity with a predetermined casting pressure passes through the step, which is formed between the mold and the cast-in member (joint member) due to the presence of the gap, to project toward the bonding portion of the cast-in member (joint member) with a flow rate not reduced by the step. Accordingly, possibility of the deposition of burr in a wide range from the peripheral edge of the aluminum die-cast component to the bonding portion (welded surface) still remains.

In view of this, the present invention is accomplished for solving these problems. Specifically, the present invention aims to appropriately form a gap needed to set the cast-in member into a mold, e.g., a gap that can absorb a dimensional tolerance of ±0.1.00 mm by press working of the cast-in member between the cast-in member and the mold, to surely prevent the projection of burr by closing the gap at the point when the mold is clamped, to take a countermeasure against the galvanic corrosion, and to automatically correct the positional deviation of the cast-in member into the mold by the clamping operation of the mold.

Solution to Problem

In order to attain the foregoing objects, a cast-in structure for a cast-in member and a cast-in mold according to the present invention has at least features described below.

Specifically, the present invention provides a cast-in structure for a cast-in member, which is made of a steel plate and which is wrapped cast upon molding a die-cast component by means of a cast-in mold except for a bonding portion bonded to a steel plate bonding member, wherein the cast-in member includes a mold contact portion on both surfaces at a boundary between a cast-in portion wrapped cast with the die-cast component and the bonding portion, wherein the mold contact portion is brought into intimate butting contact with the cast-in mold, when the cast-in mold is clamped.

Specifically, the mold contact portion of the cast-in member is formed to have a taper shape, and the mold contact portion is brought into intimate butting contact by the taper structure with the cast-in mold, when the cast-in mold is clamped. The cast-in member is formed into a cylinder. The cast-in member includes internal and external mold contact taper surface portions of the mold contact portion, formed to have a taper shape and formed consecutively on the entire circumference in an axial direction of the cylinder. The internal and external mold contact taper surface portions are formed on a boundary between the bonding portion on one end of the cast-in member and the cast-in portion on the other end of the cast-in member, and when the cast-in mold is clamped, a tapered butting portion formed on the cast-in mold is brought into intimate butting contact with the internal and external mold contact taper surface portions.

According to these configurations, when the cast-in mold is clamped, the cast-in mold is in intimate butting contact with the mold contact portions on both surfaces of the cast-in member, whereby the gap on both surfaces at the casting boundary of the cast-in member (the boundary between the cast-in portion and the bonding portion) are closed. This structure prevents the molten metal cast in the mold from projecting on both surfaces of the bonding portion, bonded to the steel plate bonding member, of the cast-in member. In other words, the projection of burr toward the bonding portion can be prevented.

The cast-in member is formed into a cylinder, and the mold contact portion is formed to have a taper shape and formed consecutively on the entire circumference in an axial direction of the cylinder. With this configuration, when the cast-in mold is clamped, the gap on both surfaces on the casting boundary of the cast-in member can be closed, and at the same time, the cast-in member can be positioned to the cast-in mold.

Specifically, in a case where the cast-in member is positionally shifted with respect to the cast-in mold when the cast-in member is carried and set to the cast-in mold, the cast-in member can automatically be corrected to be positioned on a correct set position (posture) of the cast-in mold by the clamping operation of the cast-in mold that is brought into intimate butting contact with the internal and external mold contact taper surface portions of the mold contact portion, which are formed to have a taper shape and formed consecutively on the entire circumference in an axial direction of the cylinder.

The present invention also provides a cast-in mold being configured to cast-in a steel plate cast-in member to a die-cast component by setting a cast-in portion of the steel plate cast-in member into a cavity except for a bonding portion to be bonded to a steel plate bonding member, wherein the cast-in mold includes a butting portion that is brought into intimate butting contact with a mold contact portion upon mold clamping, the mold contact portion being formed on both surfaces of the cast-in member at a boundary between the cast-in portion and the bonding portion of the cast-in member.

In this case, it is preferable that the butting portion is formed into a taper shape, and is brought into intimate butting contact with the mold contact portion, which is similarly formed into a taper shape. It is also preferable that the butting portion is provided with a biting projection that bites the mold contact portion of the cast-in member. In this case, it is preferable that hardness (Hv) of the biting projection is more than three times the hardness (Hv) of the steel plate cast-in member. For example, when the hardness (Hv) of the steel plate cast-in member is 140 or lower, the hardness (Hv) of the biting projection is preferably 420 or higher, more preferably 500 or higher.

The cast-in mold includes a fixed mold and a movable mold, each having an external butting taper surface portion of the butting portion that is brought into intimate butting contact with an external mold contact taper surface portion of the mold contact portion, the external mold contact taper surface portion being formed on both the internal and external surfaces of the cylinder to have a taper shape and formed consecutively on the entire circumference in an axial direction of a cylinder of the cast-in member formed into a cylindrical shape; and a movable core having an internal butting taper surface portion of the butting portion, the internal butting taper surface portion being brought into intimate butting contact with the internal mold contact taper surface portion of the mold contact portion.

According to this configuration, when the cast-in mold is clamped, the butting portion is brought into intimate butting contact with the mold contact portions on both surfaces of the cast-in member, whereby the gap on both surfaces at the casting boundary of the cast-in member (the boundary between the cast-in portion and the bonding portion) are closed. This structure prevents the molten metal cast in the cavity from projecting of the bonding portion, bonded to the steel plate bonding member, of the cast-in member. In other words, the projection of burr toward the bonding portion can surely be prevented.

The cast-in member is formed into a cylinder, and the mold contact portion is formed to have a taper shape and formed consecutively on the entire circumference in an axial direction of the cylinder. With this configuration, when the cast-in mold is clamped, the gap on both surfaces on the casting boundary of the cast-in member can be closed, and at the same time, the cast-in member can be positioned to the cast-in mold.

Specifically, in a case where the cast-in member is positionally shifted with respect to the mold when the cast-in member is set to the cast-in mold, the gap on both surfaces on the casting boundary of the cast-in member can be closed, and at the same time, the cast-in member can automatically be corrected to be positioned on a correct set position (posture) of the cast-in mold by the clamping operation of the internal and external butting portion of the cast-in mold that is brought into intimate butting contact with the internal and external mold contact taper surface portions of the mold contact portion of the cast-in member.

When the butting portion is brought into intimate butting contact with the mold contact portion of the cast-in member by the mold clamping, the biting projection bites the mold contact portion. Thus, the gap at the casting boundary (boundary between the cast-in portion and the bonding portion) of the cast-in member can be closed by a synergic action of the intimate butting-contact and the biting projection biting the mold contact portion. It can be expected that this structure can surely prevent the burr from projecting toward the bonding portion of the cast-in member.

Advantageous Effect of the Invention

According to the cast-in structure for a cast-in member of the present invention, when a cast-in mold is clamped, the cast-in mold is brought into intimate butting contact with the mold contact portion of the steel plate cast-in member, whereby the gap on both surfaces at the casting boundary of the cast-in member (the boundary between the cast-in portion and the bonding portion) are closed. This structure can surely prevent the projection of burr from casting boundary.

Accordingly, the deposition of burr on the bonding portion of the steel plate cast-in member can be prevented. Therefore, a deburring work that is troublesome and burdensome is not at all needed. Accordingly, productivity is enhanced, and sufficient bonding strength (weld strength) is attained, and with this state, the bonding portion of the cast-in member can be bonded to the steel plate bonding member by welding. In addition, burr is not deposited on the bonding portion of the cast-in member. Therefore, an effect of a countermeasure against a galvanic corrosion, caused by corrosion due to a contact of different kind of metals, can also be expected.

In the cast-in structure, the cast-in member is formed into a cylinder, and the mold contact portion is formed to have a taper shape and formed consecutively on the entire circumference in an axial direction of the cylinder. With this configuration, when the cast-in mold is clamped, the cast-in mold is brought into intimate butting contact with the internal and external mold contact taper surface portions of the mold contact portion. According to this structure, the cast-in member can be positioned into the cast-in mold, and can be wrapped cast with the die-cast component.

Specifically, in a case where the cast-in member is positionally shifted with respect to the mold when the cast-in member is set to the cast-in mold, the cast-in member can automatically be corrected to be positioned on a correct set position of the cast-in mold by the clamping operation of the cast-in mold that is brought into intimate butting contact with the internal and external mold contact taper surface portions of the mold contact portion, particularly is brought into intimate butting contact with the internal mold contact taper surface portion. With this process, the cast-in member is wrapped cast with the die-cast component. Accordingly, the cast-in member can be wrapped cast and bonded to the die-cast component with high strength, whereby the die-cast component with reliable quality can be cast.

According to the cast-in mold of the present invention, when the cast-in mold is clamped, the tapered butting portion is brought into intimate butting contact with the tapered mold contact portion of the cast-in member, so that the gap on both surfaces at the casting boundary of the cast-in member (the boundary between the cast-in portion and the bonding portion) are closed. With this state, the molten metal can be cast into the cavity. The gap on both surfaces can more surely be closed by a synergic action of the intimate butting-contact and the biting projection biting the mold contact portion. With this state, the molten metal can be cast into the cavity.

The cast-in member can be wrapped cast to the die-cast component with the cast-in structure (structure for preventing the projection of burr) that perfectly prevents the projection of burr from the casting boundary of the cast-in member.

DESCRIPTION OF EMBODIMENTS

A cast-in structure of a cast-in member and a cast-in mold according to an embodiment of the present invention will be described below in detail with reference to the accompanying drawings. It is to be noted that the present invention is not limited by the embodiment.

Figure 1:
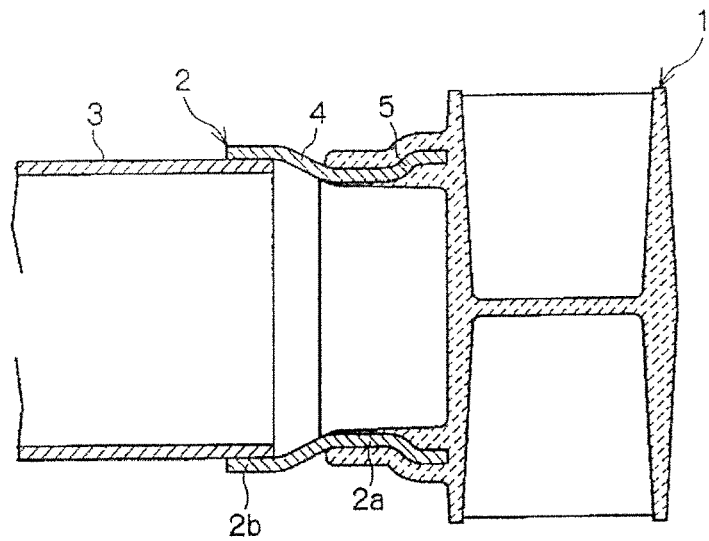
FIG. 1 is a sectional view illustrating one example of a die-cast component that is wrapped cast by means of a cast-in structure and a cast-in mold according to an embodiment of the present invention, wherein the die-cast component is bonded to a steel plate bonding member by welding.

FIG. 1 is a sectional view illustrating one example of a die-cast component cast by the cast-in structure and the cast-in mold according to the embodiment of the present invention, wherein the die-cast component is bonded to a steel plate bonding member by welding.

[Description of Cast-in Structure]

The cast-in structure is a structure in which the steel plate cast-in member 2 is wrapped cast and bonded, with a bonding portion 2b being left (except for the bonding portion 2b), to the steel plate bonding member 3 upon molding a die-cast component 1. When a later-described cast-in mold A is clamped, later-described butting portions 9 and 11 of the cast-in mold A are brought into intimate butting contact with a later-described mold contact portion 4 of the cast-in member 2, whereby a gap S between the cast-in member 2 and the cast-in mold A within an intimate butting-contact portion (range) is closed. This structure prevents a projection of burr toward the bonding portion 2b of the cast-in member 2 set on a position outside a cavity a as illustrated in later-described FIG. 6 (see FIG. 6(a) described later).

The die-cast component 1 is cast by using a molten metal mainly including a light alloy metal such as aluminum, magnesium, or zinc.

<<Structure of Cast-in Member>>

Figure 2:
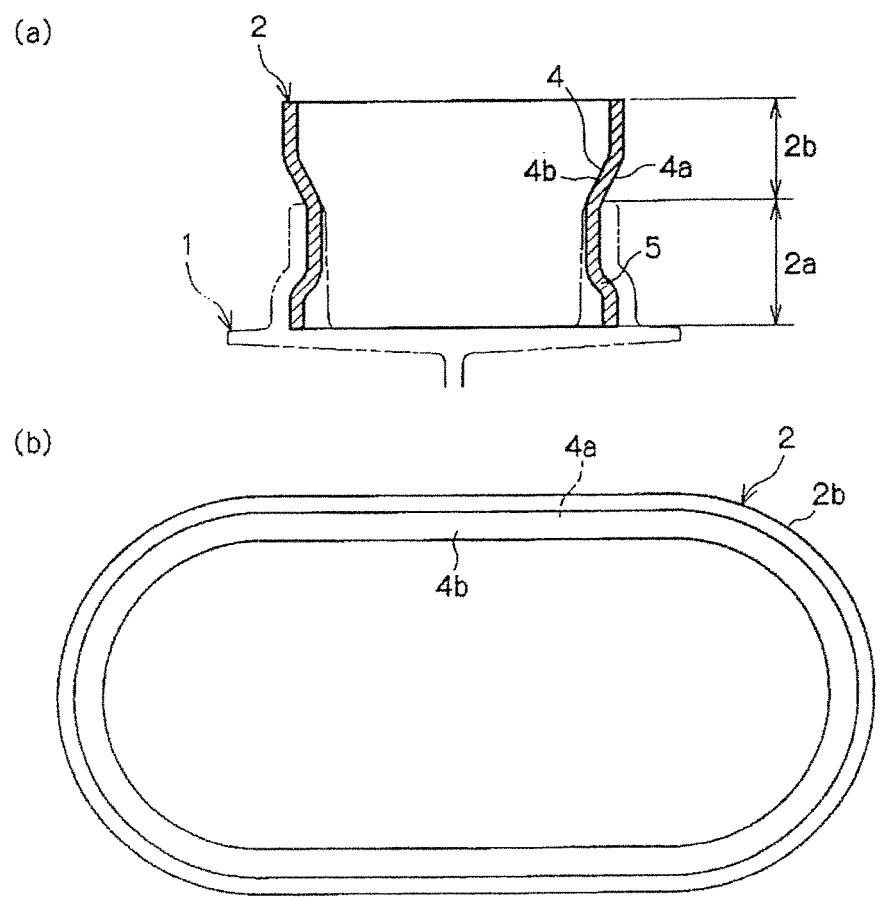
FIG. 2 is a view illustrating one example of a cast-in member wrapped cast and bonded to the die-cast component, wherein (a) is a sectional view, and (b) is a side view viewed from a bonding portion bonded to the steel plate bonding member by welding.

FIG. 2 is a sectional view and a side view illustrating one example of the cast-in member. The structure will be described with reference to FIG. 1, according to need.

The cast-in member 2 includes a cast-in portion 2a that is wrapped cast upon molding the die-cast component 1, and the bonding portion 2b that is bonded to the steel plate bonding member 3 by welding, such as resistance spot welding or stud welding. The cast-in member 2 also includes a mold contact portion 4 on the boundary between the cast-in portion 2a and the bonding portion 2b.

The cast-in member 2 is made of a steel plate (iron-based metal) with a material same as the material of the bonding member 3 with a desired thickness, e.g., about 3 mm. This steel plate undergoes a press bending process, and then, butt bonding portions are bonded (fixed) by welding, whereby the cast-in member 2 is formed into a cylinder with a desired length (mm).

Specifically described, the cast-in member 2 is formed into substantially a rectangular cylinder in which short sides on both sides are bent in an arc shape in a plan view as illustrated in FIG. 2. The bonding portion 2b on one end of the opening is bonded to the bonding member 3 by welding, while the cast-in portion 2a on the other end of the opening is integrally wrapped cast upon molding the die-cast component 1 as illustrated in FIG. 1.

<<Structure of Mold Contact Portion>>

The mold contact portion 4 is a portion with which a butting portion 9 of a cast-in mold A is brought into intimate butting contact, when the cast-in member 2 is set to the cast-in mold A for mold clamping.

As illustrated in FIG. 2, the portion between the cast-in portion 2a and the bonding portion 2b of the cast-in member 2 is narrowed (the diameter of the cylinder is reduced) almost parallel to the axis of the cast-in member 2 except for the ends of the cast-in portion 2a and the bonding portion 2b. Thus, the mold contact portion 4 is formed on the boundary between the cast-in portion 2a and the bonding portion 2b so as to be consecutive in the whole circumference along the axial direction of the cylinder of the cast-in member 2 with a taper shape having a predetermined tilt angle.

As illustrated in FIG. 2(b), the mold contact portion 4 formed to be consecutive in the entire circumferential direction with the taper shape at the boundary between the cast-in portion 2a and the bonding portion 2b includes an external mold contact taper surface portion 4a and an internal mold contact taper surface portion 4b. Butting portions 9 of both of later-described fixed and movable molds A1 and A2, out of butting portions 9 and 11 provided respectively to the fixed and movable molds A1 and A2 and a later-described movable core A3 of the cast-in mold A, are brought into intimate butting contact with the external mold contact taper surface portion 4a, when the cast-in mold A is clamped. The butting portion 11 of the movable core A3 is brought into intimate butting contact with the internal mold contact taper surface portion 4b, when the cast-in mold A is clamped.

Specifically, the cast-in member 2 is set and held such that the cast-in member 2 is sandwiched and pressed by both of the fixed mold A1 and the movable mold A2, which are brought into intimate butting contact with the external mold contact taper surface portions 4a of the mold contact portion 4, and the movable core A3 that is brought into intimate butting contact with the internal mold contact taper surface portion 4b from both of the inner and outer surfaces of the cylinder, when the cast-in mold A is clamped. In this state, the cast-in portion 2a is inserted into a cavity a (see FIG. 6(a) described later).

The tilt angles (taper angle) e of the external mold contact taper surface portion 4a and the internal mold contact taper surface portion 4b of the cast-in member 2 in the axial direction of the cylinder are not particularly limited, but they are preferably set to be about 27°.

As illustrated in FIGS. 1 and 2, a constricted portion 5 is formed on the cast-in portion 2a of the cast-in member 2 in the present embodiment. The constricted portion 5 is formed to be consecutive on the whole circumference of the cast-in member 2. With this structure, the cast-in bonding strength at the cast-in portion 2a of the cast-in member 2, which is wrapped cast with the die-cast component 1, is strengthened by the constricted portion 5. Therefore, the cast-in member 2 is wrapped cast and bonded with high strength and high rigidity with no chance of being slipped from the die-cast component 1.

Although not illustrated, the shape of the constricted portion 5 is not particularly limited. Specifically, any shape can be employed, so long as the constricted portion 5 can increase the cast-in bonding strength to the die-cast component 1 with high strength and high rigidity for preventing the cast-in member 2 from slipping from the die-cast component 1.

According to the cast-in structure of the present embodiment described above in detail, when the cast-in mold A is clamped, the cast-in mold A is brought into intimate butting contact with the internal and external mold contact taper surface portions 4a and 4b of the mold contact portion 4 of the cast-in member 2, whereby a gap S on both surfaces at the boundary between the cast-in portion 2a and the bonding portion 2b of the cast-in member 2 is sealed.

This structure surely prevents molten metal, which is cast in the cast-in mold A (cavity a) with the cast-in portion 2a of the cast-in member 2 being wrapped cast, from projecting toward the bonding portion 2b of the cast-in member 2 that is bonded to the steel plate bonding member 3 by welding. In other words, projection of burr toward the bonding portion 2b can surely be prevented.

<<Structure of Cast-in Mold>>

Subsequently, the cast-in mold A according to the embodiment of the present invention will be described. FIGS. 3 to 6 are explanatory sectional views illustrating an operation of the cast-in mold according to the embodiment of the present invention. The structure will be described with reference to FIG. 2, according to need.

The cast-in mold A is a die-cast mold formed such that the cast-in portion 2a of the cast-in member 2 is wrapped cast and bonded to the die-cast component 1 with the bonding portion 2b that is bonded to the steel plate bonding member 3 being left (except for the bonding portion 2b that is bonded to the steel plate bonding member 3 by welding).

The cast-in mold A has a structure including a fixed mold A1, the movable mold A2 that can perform mold clamping and mold opening relative to the fixed mold A1, and the movable core (pull-out core) A3 that is assembled to the movable mold A2 so as to be capable of advancing and retreating (moving vertically) and forms the cavity a with both of the fixed mold A1 and the movable mold A2.

As illustrated in FIGS. 3 to 6, the cast-in mold A is formed as described below. Specifically, the cast-in member 2 is set and held such that the cast-in portion 2a of the cast-in member 2 faces the cavity a formed by the slidable advancing movement (descending movement) of the movable core A3 and the mold clamping of the movable mold A2 relative to the fixed mold A1, and with this state, molten metal such as aluminum, magnesium, or zinc is cast in the cavity a.

The fixed mold A1 and the movable mold A2 respectively include a cavity surface 6 forming the cavity a, a core slide concave cutout portion 7 formed on the cavity surface 6 such that the core slide concave cutout portion 7 go through toward the outside of the mold, and an insert holding portion 8 and the butting portion (press-contact portion) 9 formed on the boundary between the core slide concave cutout portion 7 and the cavity surface 6.

The core slide concave cutout portion 7 is formed on mold parting surfaces (mating surfaces) of the fixed mold A1 and the movable mold A2. The planar shape of the core slide concave cutout portion 7 matches the cross-section of the movable core A3 split into two in the longitudinal direction in order that the movable core A3 can freely slide during the mold clamping operation and mold opening operation.

The insert holding portion 8 formed on the movable mold A2 has a function of temporarily holding the cast-in member 2 in cooperation with the movable core A3 in order to prevent the cast-in member 2 from falling until the mold clamping of the movable mold A2 relative to the fixed mold A1 is completed.

Figure 3:
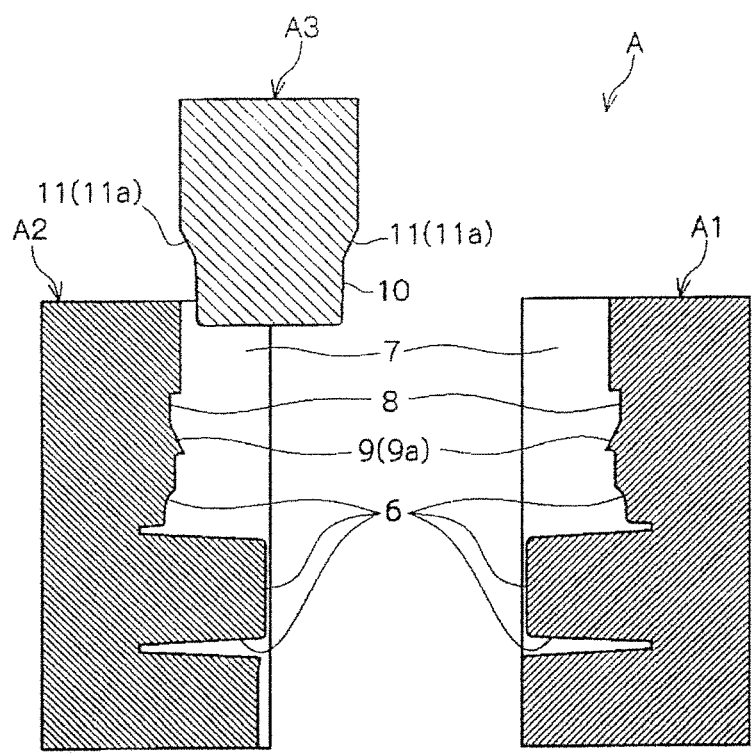
FIG. 3 is an operation explanatory view illustrating a section of one example of a cast-in mold according to the embodiment of the present invention, wherein (a) illustrates a mold opening state, and (b) illustrates that a cast-in member is carried to a movable mold.
Figure 3:
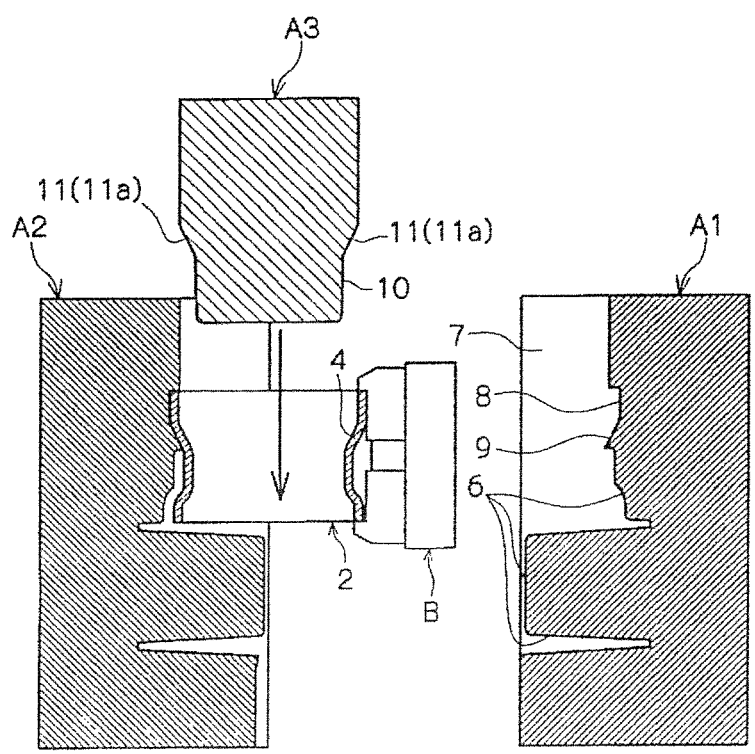

More specifically described, as illustrated in FIG. 3 (b) the cast-in member 2 is gripped by a carrier device B, such as a hand robot, and conveyed to the movable mold A2. The insert holding portion 8 has a function of receiving and holding the cast-in member 2, in cooperation with the movable core A3 inserted into the cylinder of the cast-in member 2 during the period from when the grip of the cast-in member 2 by the carrier device B is canceled and the carrier device B is returned to a stand-by position, not illustrated, at the outside of the mold from the portion between the fixed mold A1 and the movable mold A2 till when the mold clamping of the movable mold A2 relative to the fixed mold A1 is completed as illustrated in FIG. 6(a).

As illustrated in FIG. 3, the insert holding portion 8 is formed on the core slide concave cutout portion 7 at the boundary of the cavity surface 6, and is formed to have a hollow shape, matching the shape of the longitudinal surface of the bonding portion 2b of the cast-in member 2, with a depth (step) corresponding to the thickness (plate thickness) of the cylinder of the cast-in member 2.

Although not illustrated, the insert holding portion 8 is formed on the core slide concave cutout portions 7 of the fixed mold A1 and the movable mold A2 to have a planar shape, which is formed by splitting the cast-in member 2 into two in the longitudinal direction, along the outer surface of the bonding portion 2b of the cast-in member 2. The cast-in member 2 is formed to have a rectangular shape by bending both short sides into an arc shape as illustrated in FIG. 2.

<<Structure of Butting Portion>>

When the cast-in member 2 is carried to the movable mold A2 for mold clamping relative to the fixed mold A1, the butting portion 9 is brought into intimate butting contact with the external mold contact taper surface portion 4a of the mold contact portion 4 of the cast-in member 2, thereby closing the gap S between the cast-in mold and the cast-in member 2. The butting portion 9 also has a function of setting and holding the cast-in member 2 immovable in the cavity a in cooperation with the butting portion 11 of the movable core A3.

As illustrated in FIG. 3, the butting portion 9 is an external butting taper surface portion 9a formed to have a taper shape with the tilt angle (taper angle) θ of the external mold contact taper surface portion 4a of the cast-in member 2. The butting portion 9 tilts toward the direction from the insert holding portion 8 of the fixed mold A1 and the movable mold A2 toward the cavity surface a (in the axial direction of the cylinder of the cast-in member 2).

The external butting taper surface portion 9a is formed to have a length shorter than the length of the taper (the length of the taper of the cast-in member 2 in the axial direction of the cylinder) of the external mold contact taper surface portion 4a in the axial direction of the cylinder of the cast-in member 2. For example, the external butting taper surface portion 9a is formed to be shorter by about 1 to 2 mm.

According to this configuration, when the movable mold A2 is clamped relative to the fixed mold A1, the external butting taper surface portion 9a is surely brought into intimate butting contact with the external mold contact taper surface portion 4a of the mold contact portion 4 of the cast-in member 2, whereby the gap S between the cast-in mold A and the cast-in member 2 can surely be closed. In addition, the external butting taper surface portion 9a holds the cast-in member 2 by press-contact from the inner surface and the outer surface of the cast-in member 2 with the butting portion 11 of the movable core A3.

<<Structure of Movable Core>>

The movable core A3 is assembled and supported to the core slide concave cutout portion 7 on the movable mold A2 so as to be capable of advancing and retreating (moving vertically) by a driving unit, not illustrated, such as a core puller.

The movable core A3 is formed into a block having a predetermined height, e.g., a height equal to the cast-in depth of the cast-in member 2, in a cross section of the inner surface of the cylinder of the cast-in member 2 (the rectangular shape in which both short sides are consecutive in an arc shape) and in a cross section of the core slide concave cutout portions 7 on the fixed mold A1 and the movable mold A2.

As illustrated in FIG. 6(a), the movable core A3 has a cavity forming surface portion 10. The cavity forming surface portion 10 is formed on a lower half portion (leading end) that is inserted into the cast-in portion 2a of the cast-in member 2, when the movable core A3 slidably advances into (move down into) the cylinder of the cast-in member 2 up to a slide forward limit. The cavity forming surface portion 10 is formed to be slightly smaller than an upper half portion of the movable core A3. The movable core A3 also has the butting portion 11 formed to be continuous with the cavity forming surface portion 10 on the upper half portion at the boundary with the cavity forming surface portion 10.

<<Structure of Butting Portion>>

The butting portion 11 is brought into intimate butting contact with the internal mold contact taper surface portion 4b of the mold contact portion 4 of the cast-in member 2 by the mold-clamping operation of the movable core A3 that moves into the cylinder of the cast-in member 2 up to the slide forward limit, after the mold-clamping of the movable mold A2 relative to the fixed mold A1 is completed. Thus, the butting portion 11 closes the gap S between the butting portion 11 and the internal mold contact taper surface portion 4b. The butting portion 11 also has a function of setting and holding the cast-in member 2 immovable with the external butting taper surface portion 9a of the butting portion 9 on each of the fixed mold A1 and the movable mold A2.

The butting portion 11 is an internal butting taper surface portion 11a formed into a taper shape with the tilt angle (taper angle) θ of the internal mold contact taper portion 4b of the mold contact portion 4 of the cast-in member 2 as illustrated in FIG. 3. The butting portion 11 has a sectional shape matching the inner surface of the cylinder of the cast-in member 2 at the side of the bonding portion 2b and the concave cutout inner surfaces of the slide concave cutout portions 7 on both the fixed mold A1 and the movable mold A2. The butting portion 11 is formed (in the axial direction of the cylinder of the cast-in member 2) from the cavity forming surface portion 10 toward the upper half portion of the movable core A3, which is larger (wider) than the cavity forming surface portion 10.

The internal butting taper surface portion 11a is formed to have a length shorter than the length of the taper (the length of the taper of the cast-in member 2 in the axial direction of the cylinder) of the internal mold contact taper surface portion 4b in the axial direction of the cylinder of the cast-in member 2. For example, the internal butting taper surface portion 11a is formed to be shorter by about 1 to 2 mm.

According to this configuration, when the movable core A3 slidably advances into the cylinder of the cast-in member 2 up to the slide forward limit (when the movable core A3 slidably moves down), the internal butting taper surface portion 11a is surely brought into intimate butting contact with the internal mold contact taper surface portion 4b of the mold contact portion 4 of the cast-in member 2, whereby the gap S between the internal butting taper surface portion 11a and the cast-in member 2 can surely be closed. In addition, the internal butting taper surface portion 11a holds the cast-in member 2 by press-contact from the inner surface and the outer surface of the cast-in member 2 with the external butting taper surface portion 9a of each of the fixed mold A1 and the movable mold A2.

In the present embodiment, as illustrated in FIG. 6(a), the intimate butting-contact between the internal butting taper surface portion 11a of the movable core A3 and the internal mold contact taper surface portion 4b of the cast-in member 2 and the intimate butting-contact between the external butting taper surface portions 9a of the fixed mold A1 and the movable mold A2 and the external mold contact taper surface portion 4a of the cast-in member 2 are achieved with the intimate-contact range L from both the inside and outside of the cylinder. Specifically, the present embodiment provides the intimate butting-contact structure from both the inner surface and the outer surface of the cylinder, and this structure can surely prevent the burr from projecting on the inner surface and the outer surface of the cylinder of the cast-in member 2 at the bonding portion 2b.

[Operation]

A cast-in operation of the cast-in member 2 by using the cast-in mold A configured as described above will briefly be described. The operation will be described with reference to FIGS. 3 to 6, according to need.

A mold opening state illustrated in FIG. 3(a) where the fixed mold A1, the movable mold A2, and the movable core A3 are opened will firstly be described. In this mold opening state, the cast-in member 2 gripped by the carrier device B such as a hand robot is carried to the movable mold A2 as illustrated in FIG. 3(b). In this case, the cast-in member 2 is carried to the movable mold A2 such that the bonding portion 2b of the cast-in member 2 is located to be in contact with the insert holding portion 8 of the movable mold A2.

Figure 4:
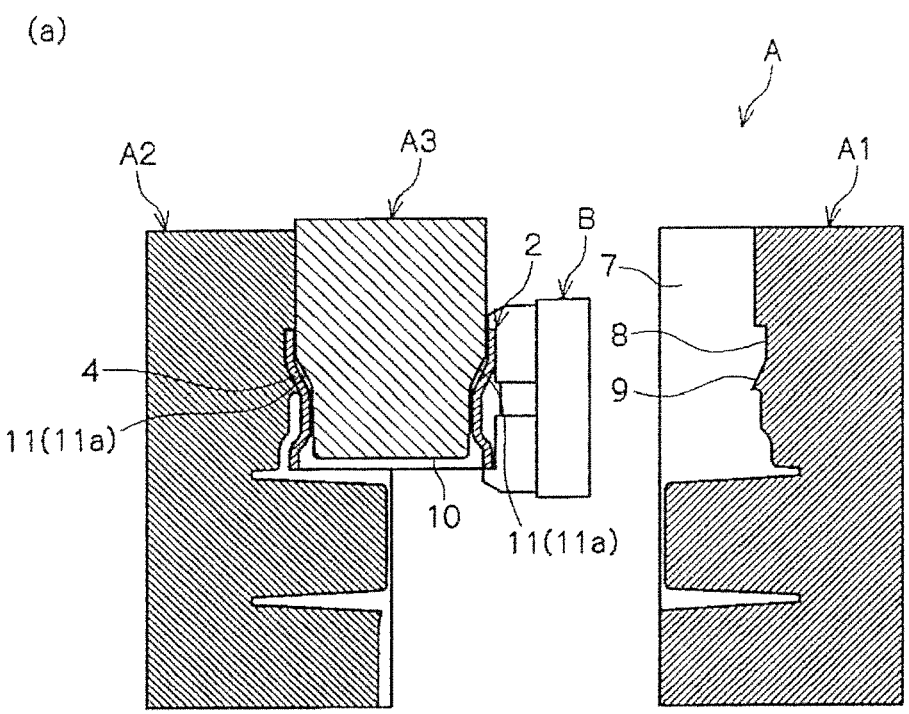
FIG. 4 is also an operation explanatory view, wherein (a) illustrates that a movable core is inserted into a cylinder of the cast-in member carried to the movable mold, and (b) illustrates that a carrier device is returned to a stand-by position outside the mold, and the movable mold starts clamping relative to a fixed mold.
Figure 4:
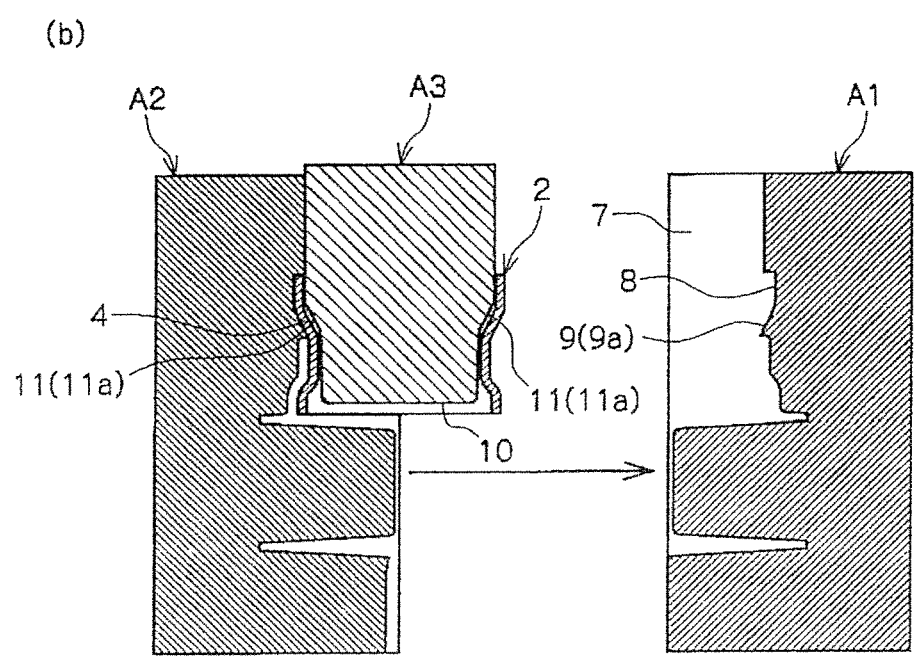

After the cast-in member 2 is carried to the movable mold A2 by the carrier device B, the movable core A3 starts to slidably advance (slidably moves down), as illustrated in FIGS. 3(b) to 4(a), whereby the movable core A3 is inserted into the cylinder of the cast-in member 2. In this case, the movable core A3 slidably advances into the cylinder before the slide forward limit in the cylinder of the cast-in member 2 (the state illustrated in FIG. 6(a)). Specifically, as illustrated in FIG. 4, the movable core A3 is temporarily stopped at the slide advancing position with the bonding portion 2b of the cast-in member 2 being held by the insert holding portion 8 of the movable mold A2 in order to prevent the cast-in member 2 from falling or from being positionally shifted. The movable core A3 waits on this slide advancing position.

When the cast-in member 2 carried to the movable mold A2 is held (nipped) by the insert holding portion 8 of the movable mold A2 due to the slidable advancing motion of the movable core A3, the gripped state of the cast-in member 2 by the carrier device B is canceled. Then, the carrier device B is returned to the stand-by position at the outside of the mold, not illustrated, from the portion between the fixed mold A1 and the movable mold A2.

Figure 5:
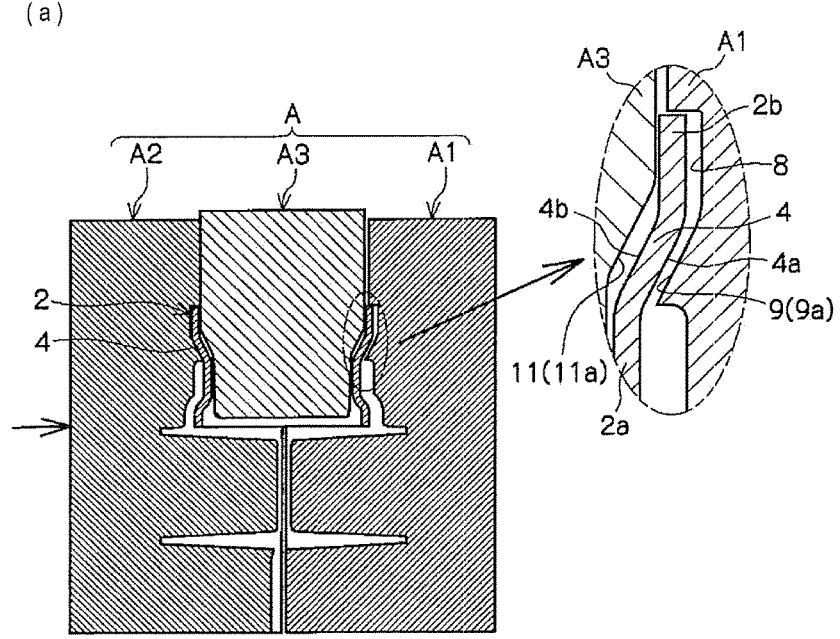
FIG. 5 is also an operation explanatory view, wherein (a) illustrates a state just before the movable mold is clamped relative to the movable mold, and (b) illustrates the state in which the mold clamping of the movable mold relative to the fixed mold is completed, and the movable core starts to move to a slide forward limit in the cylinder of the cast-in member.
Figure 5:
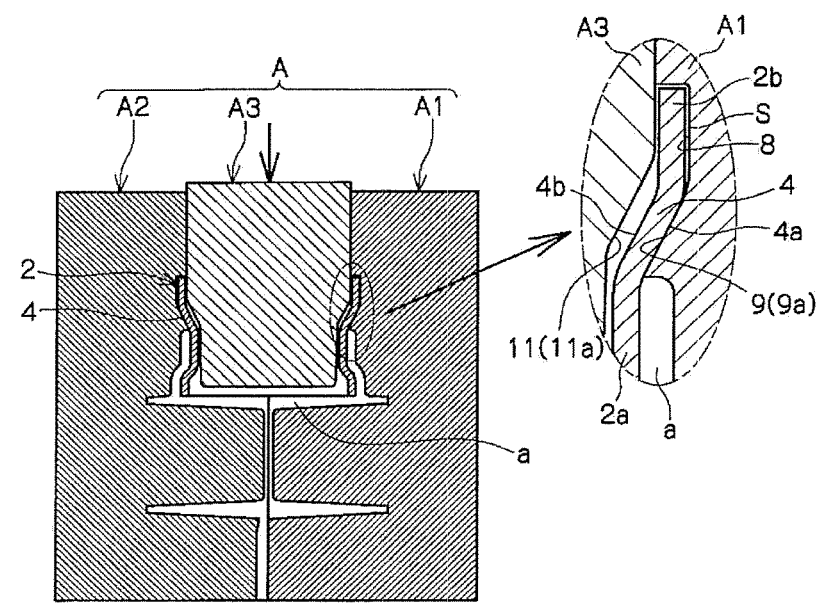

When the cast-in member 2 is held by the movable mold A2 and the movable core A3, and the carrier device B is returned to the stand-by position at the outside of the mold, the mold-clamping of the movable mold A2 relative to the fixed mold A1 is started as illustrated in FIGS. 4(b) to 5(b). In this case, as illustrated in FIGS. 5(a) and 5(b), the mold-clamping of the movable mold A2 relative to the fixed mold A1 is completed in a state in which the bonding portion 2b of the cast-in member 2 is located to be in contact with the insert holding portion 8 of the fixed mold A1. After the mold-clamping is completed, the external butting taper surface portions 9a of the fixed mold A1 and the movable mold A2 are brought into intimate butting contact with the external mold contact taper surface portions 4a of the cast-in member 2, as illustrated in FIG. 5(b).

Figure 6:
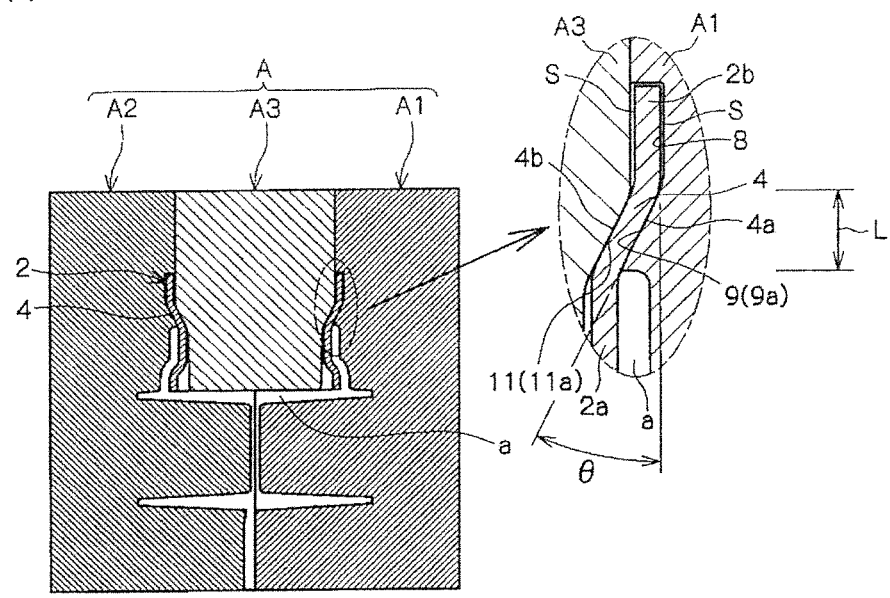
FIG. 6 is also an operation explanatory view, wherein (a) illustrates the state of completing the mold clamping operation in which the movable core moves to the slide forward limit in the cylinder of the cast-in member, and (b) illustrates a state in which a molten metal is cast in a cavity after a series of mold clamping operation is completed.
Figure 6:
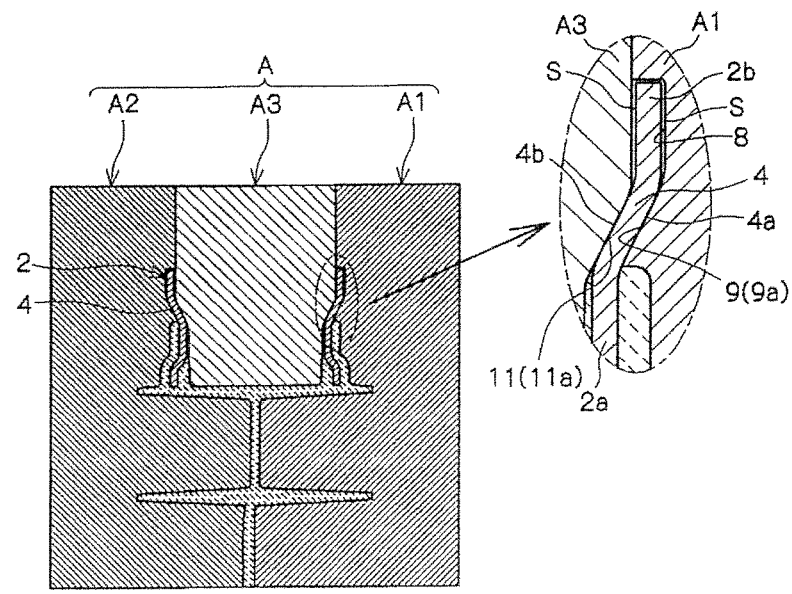

After the mold-clamping of the movable mold A2 relative to the fixed mold A1 is completed, the movable core A3, which is stopped before the slide forward limit in the cylinder of the cast-in member 2 illustrated in FIGS. 4 (a) to 5 (b), slidably advances (moves) to the slide forward limit in the cylinder of the cast-in member 2 as illustrated in FIG. 6 (a). With this, as illustrated in FIG. 6(a), the internal butting taper surface portions 11a of the movable core A3 are brought into intimate butting contact with the internal mold contact taper surface portions 4b of the cast-in member 2.

The order of the mold-clamping operation of the cast-in mold A described above is only one example, and the order is not limited to this order of the mold-clamping operation. A general mold-clamping operation may be employed. Specifically, at a point when the cast-in member 2 is carried to the movable mold A2 that is opened, the movable core A3 can slidably advance (slidably move down) to the slide forward limit in the cylinder of the cast-in member 2, and at the point when the carrier device B is returned to the stand-by position, not illustrated, at the outside of the mold, the mold-clamping operation of the movable mold A2 can be started, and then, the mold-clamping of the movable mold A2 relative to the fixed mold A1 can be completed.

As described above, according to the cast-in mold A including the fixed mold A1, the movable mold A2, and the movable core A3 according to the present embodiment, the gap S on both surfaces at the boundary between the cast-in portion 2a and the bonding portion 2b of the cast-in member 2 is closed by the intimate butting-contact between the cast-in member 2 and the fixed mold A1, the movable mold A2, and the movable core A3 from the inner surface and the outer surface of the cylinder, after a series of the mold-clamping operation starting from the carrier of the cast-in member 2 to the movable mold A2 is completed, as illustrated in FIGS. 6 (a) and 6 (b).

Specifically, as illustrated in an enlarged view in FIG. 6, the gap S is formed on the inner surface and the outer surface of the cylinder at the bonding portion 2b of the cast-in member 2 that is inserted into the insert holding portions 8 of the fixed mold A1 and the movable mold A2, but the gap S is closed within the intimate-contact range L on the inner surface and the outer surface of the cylinder at the mold contact portion 4 of the cast-in member 2 with which the butting portions 9 and 11 of the fixed mold A1, the movable mold A2, and the movable core A3 are brought into intimate butting contact. This structure can surely prevent the burr from projecting toward the bonding portion 2b, when the molten metal is cast in the cavity a. In other words, the projection of the burr toward the bonding portion 2b can surely be prevented.

The gap S on both surfaces between the cast-in member 2, and the fixed mold A1, the movable mold A2, and the movable core A3 are closed to prevent the projection of the burr by the intimate butting-contact by means of the taper structure composed of the external mold contact taper surface portion 4a and the internal mold contact taper surface portion 4b of the mold contact portion 4 formed on the cast-in member 2, the external butting taper surface portion 9a of the butting portion 9 formed on each of the fixed mold A1 and the movable mold A2, and the internal butting taper surface portion 11a of the butting portion 11 formed on the movable core A3. Therefore, the gap S on both surfaces can be closed, and at the same time, the cast-in member 2 can be re-positioned to a correct set position (correct set posture) in the cavity a, even when the positional deviation is generated in a set including the inside of the cavity a of the cast-in member 2.

Subsequently, a process of setting a cylindrical cast-in member 2 having a dimensional tolerance of ±1.0 mm in press working into the cavity a by means of the taper structure will be described with reference to a schematic explanatory view of FIG. 7. In the description of the setting process, the tilt angle (taper angle) 0 of the external mold contact taper surface portion 4a and the internal mold contact taper surface portion 4b of the cast-in member 2, the external butting taper surface portions 9a of the fixed mold A1 and the movable mold A2, and the internal butting taper surface portion 11a of the movable core A3 is 27°.

Figure 7:
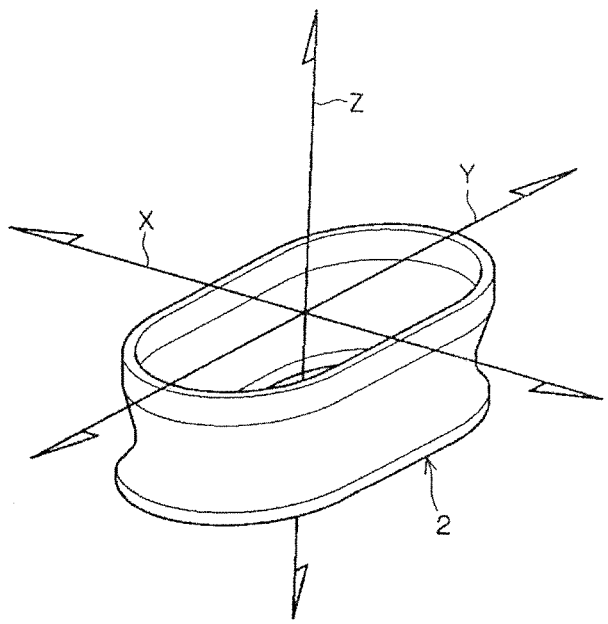
FIG. 7 is a schematic explanatory view illustrating a dimensional tolerance upon press working of the cast-in member, wherein (a) is a perspective view, and (b) is an enlarged view in the mold-clamping state.
Figure 7:
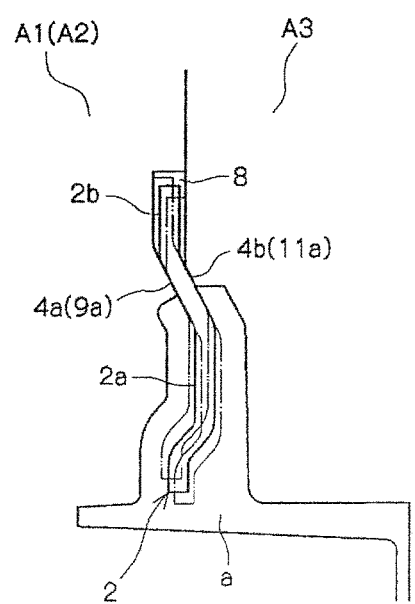

In X and Y directions and Z direction (axial direction of the cylinder) in FIG. 7 (a), a cast-in member 2 having the dimensional tolerance of ±0 mm (the size in the figure) in the Y direction is illustrated by a solid line, a cast-in member 2 having the dimensional tolerance smaller by a maximum of −1.0 mm is illustrated by a one-dot chain line, and a cast-in member 2 having the dimensional tolerance larger by a maximum of +1.0 mm is illustrated by a two-dot chain line in FIG. 7 (b).

When the cast-in member 2 having the dimensional tolerance smaller by a maximum of −1.0 mm is set into the cavity a, the cast-in portion 2a is inserted into the cavity a with an excess of 1.0 mm, compared to the cast-in member 2 having the dimensional tolerance of ±0 mm as illustrated in FIG. 7(b). When the cast-in member 2 having the dimensional tolerance larger by a maximum of +1.0 mm is set into the cavity a, the bonding portion 2b is inserted into the insert holding portion 8 with an excess of 1.0 mm, compared to the cast-in member 2 having the dimensional tolerance of ±0 mm as illustrated in FIG. 7 (b). Even if such positional deviations occur, the intimate butting-contact is surely achieved similarly with the case of the cast-in member 2 having the dimensional tolerance of ±0 mm, and the axial line of the cylinder of the cast-in member 2 (crossing axial lines in X and Y directions) can be made concentric with the axial lines of the movable core A3, by the taper structure composed of the external mold contact taper surface portion 4a and the internal mold contact taper surface portion 4b of the mold contact portion 4 formed on the cast-in member 2, the external butting taper surface portion 9a of the butting portion 9 formed on the fixed mold A1 and the movable mold A2, and the internal butting taper surface portion 11a of the butting portion 11 formed on the movable core A3, during the clamp-molding operation.

With this configuration, even if the cast-in member 2 having the dimensional tolerance of ±1.0 mm is used, the gap S on both surfaces can surely be closed within the intimate-contact range L (see FIG. 6 (a)) by the taper structure.

[Description of Cast-in Mold According to Another Embodiment]

Figure 8:
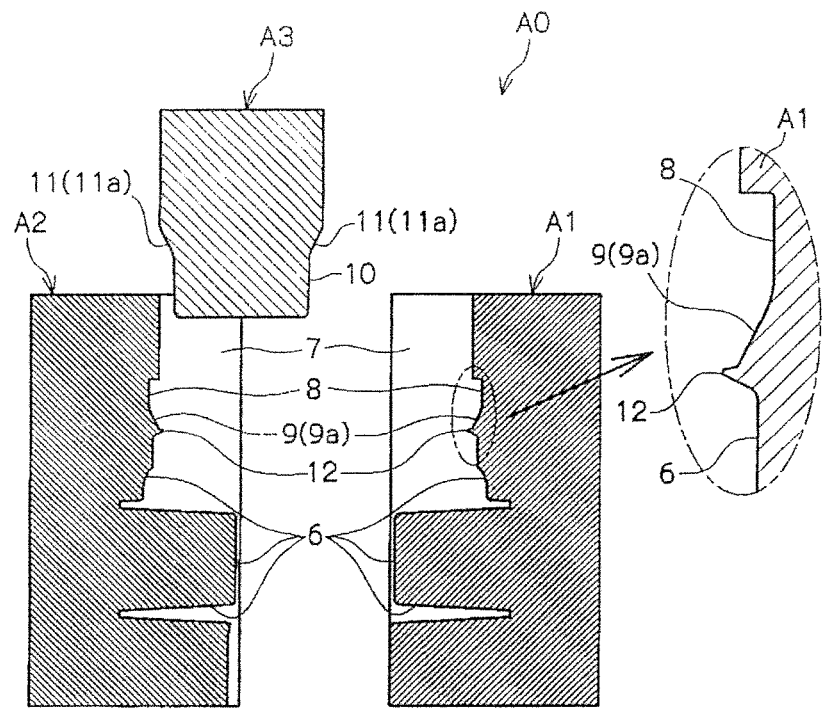
FIG. 8 is an explanatory view illustrating a section of a cast-in mold according to another embodiment of the present invention.
Figure 9:
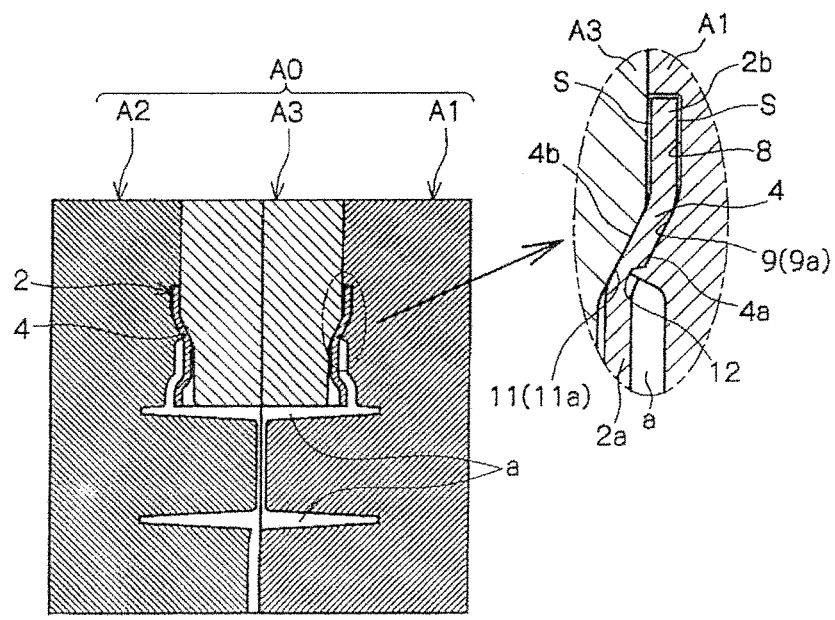
FIG. 9 is an explanatory view illustrating the mold clamping state of the cast-in mold.

FIG. 8 is an explanatory view illustrating a cast-in mold according to another embodiment of the present invention, and FIG. 9 is an explanatory view illustrating a state in which a series of mold-clamping operation of the cast-in mold is completed.

The cast-in mold in the present embodiment is basically the same as the cast-in mold A described above in detail, except that a biting projection 12 is formed on the butting portion 9 of each of the fixed mold A1 and the movable mold A2. The same components are identified by the same numerals, and the redundant description will not be made.

Specifically, as illustrated in FIGS. 8 and 9, a cast-in mold A0 has a mold structure including a fixed mold A1, a movable mold A2 that can perform a mold-clamping process and mold-opening process relative to the fixed mold A1, and a movable core A3 that is assembled to the movable mold A2 so as to be capable of slidably advancing and retreating (moving up and down) to form a cavity a with both of the fixed mold A1 and the movable mold A2.

As illustrated in FIG. 8, the biting projection 12 is formed on the butting portion 9 of each of the fixed mold A1 and the movable mold A2.

<<Structure of Biting Projection>>

As illustrated in FIG. 9, the biting projection 12 has a function of closing the gap S between the cast-in mold A0 and the cast-in member 2 in cooperation with the butting portion 9 that is brought into intimate butting contact with the mold contact portion 4 of the cast-in member 2, when the movable mold A2 is clamped relative to the fixed mold A1.

As illustrated in FIG. 8, the biting projection 12 is formed on the external butting taper surface portion 9a of the butting portion 9 at the side of the cavity surface 6, and to have an appropriate projecting shape and projecting height. Thus, as illustrated in FIG. 9, the biting projection 12 bites the external mold contact taper surface portion 4a, when the external butting taper surface portion 9a is brought into intimate butting contact with the external mold contact taper surface portion 4a of the mold contact portion 4 of the cast-in member 2.

It is preferable that hardness (Hv) of the biting projection 12 is set to be more than three times the hardness of the steel plate cast-in member. For example, when the hardness (Hv) of the steel plate cast-in member is 140 or lower, the hardness (Hv) of the biting projection 12 is preferably 420 or higher, more preferably 500 or higher. With this configuration, the biting projection 12 surely bites the cast-in member 2, every time the die-cast component 1 is cast, without causing pressure loss by a casting mold (casting shot) of the die-cast component 1, which is repeated several tens of thousands of times to hundreds of thousands of times. Accordingly, the biting projection 12 can close the gap S between the cast-in member 2 and the cast-in mold.

As described above, according to the cast-in mold A0 including the fixed mold A1, the movable mold A2, and the movable core A3, and having the biting projection 12 on the butting portion 9 of each of the fixed mold A1 and the movable mold A2, according to another embodiment, the gap S on both surfaces at the boundary between the cast-in portion 2a and the bonding portion 2b of the cast-in member 2 is closed by the intimate butting-contact between the cast-in member and the fixed mold A1, the movable mold A2, and the movable core A3 from the inner surface and the outer surface of the cylinder and the biting projection 12 biting the mold contact portion 4, after a series of the mold-clamping operation starting from the carrier of the cast-in member 2 to the movable mold A2 is completed, as illustrated in FIG. 9.

Specifically, as illustrated in an enlarged view in FIG. 9, the gap S on both surfaces is formed on the inner surface and the outer surface of the cylinder at the bonding portion 2b of the cast-in member 2 that is inserted into the insert holding portions 8 of the fixed mold A1 and the movable mold A2, but the gap S is closed by the intimate butting-contact of the butting portions 9 and 11 of the fixed mold A1, the movable mold A2, and the movable core A3, and further, the gap S is closed by a synergic action of the intimate-contact and biting at the inside and outside of the mold contact portion 4 of the cast-in member 2 bit by the biting projection 12, particularly on the external mold contact taper surface portion 4a. This structure can surely prevent the burr from projecting, when the molten metal is cast in the cavity a.

Although not illustrated, the projection shape of the biting projection 12 is not particularly limited. The projection shape may be a shape by which the biting projection 12 can bite the mold contact portion 4 when the butting portion 9 is brought into intimate butting contact with the mold contact portion 4 of the cast-in member 2. The biting amount (depth) of the biting projection 12 biting the mold contact portion 4 is preferably about 0.03 mm, when the plate thickness (wall thickness) of the cast-in member 2 is defined as 3 mm, for example.

The biting projection 12 may be detachably provided to the butting portion 9 with a packing structure in order to facilitate a maintenance operation.

Figure 10:
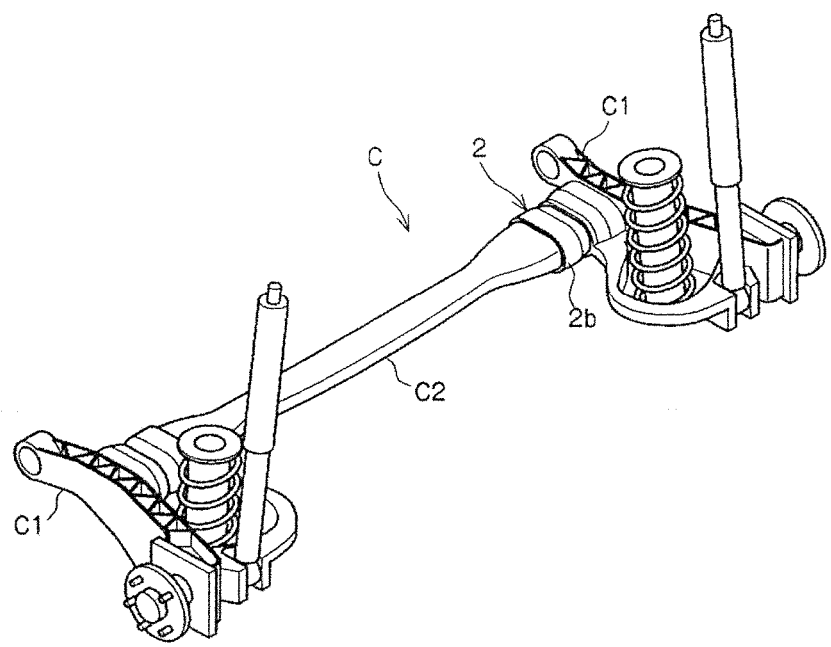
FIG. 10 is a schematic perspective view illustrating a torsion beam suspension to which a die-cast component obtained by the cast-in structure and the cast-in mold according to the embodiment of the present invention is applied.
Figure 11:
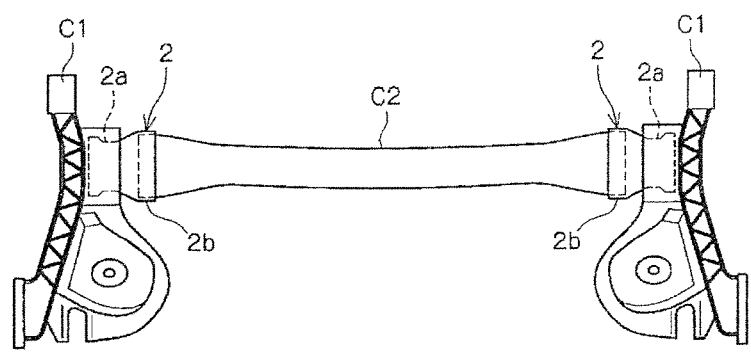
FIG. 11 is a schematic plan view of the suspension.
Figure 12:
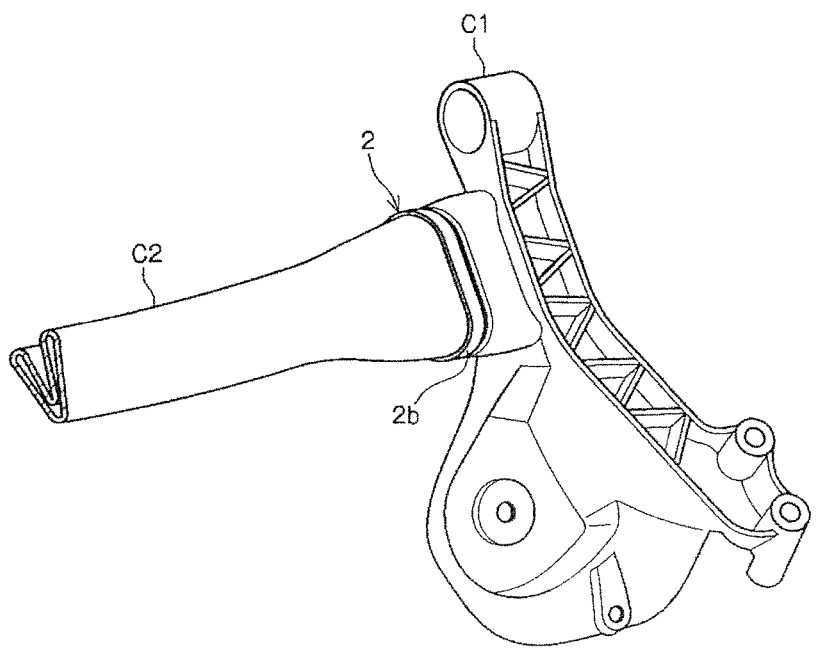
FIG. 12 is a schematic perspective view illustrating a trailing arm at one end of the suspension, the trailing arm being partially enlarged.

The die-cast component 1 cast by the cast-in structure and the cast-in molds A and A0 according to the present embodiments described above in detail can be applied as a trailing arm C1 of a torsion beam suspension C illustrated in FIGS. 10 to 12 as one example of a vehicle component (automobile component).

FIG. 10 is a schematic perspective view of a torsion beam suspension to which the die-cast component formed by the cast-in mold a cast-in structure according to the present embodiments is applied, FIG. 11 is a schematic plan view of the torsion beam suspension, and FIG. 12 is a schematic perspective view in which a trailing arm is enlarged.

Specifically, the bonding portion 2b, which is exposed to the outside, of the steel plate cast-in member 2 wrapped cast with the trailing arm C1 that is the die-cast component 1 is bonded to an end of a torsion beam C2, which is a steel plate bonding member 3 made of the same material, by welding.

Specifically described, as illustrated in FIGS. 10 to 12, the bonding portion 2b of the cast-in member 2 is externally fitted to the end of the steel plate torsion beam C2, having the same sectional shape, and with this state, the bonding portion 2b of the cast-in member 2 is bonded to the torsion beam C2 by welding. In this case, no burr is generated and deposited on the bonding portion 2b of the cast-in member 2. Therefore, the trailing arm C1 can be bonded to the end of the torsion beam C2 with high rigidity by welding.

According to this structure, the trailing arm C1, which is cast by using aluminum, can be bonded to the steel plate torsion beam C2, which is made of a different kind of metal, by welding without any problem.

[Description of Cast-in Structure and Cast-in Mold According to Another Embodiment]

A cast-in structure and a cast-in mold using a sheet-type cast-in member 20 will be described next.

Figure 13:
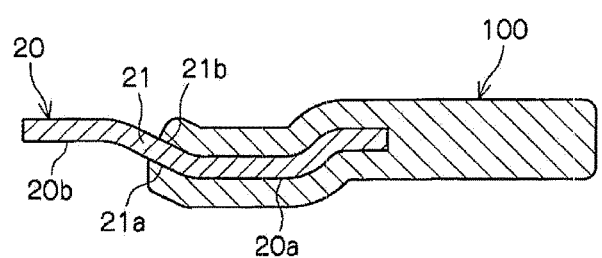
FIG. 13 is a sectional view illustrating one example of another die-cast component wrapped cast by the cast-in structure and the cast-in mold according to another embodiment of the present invention.

FIG. 13 is a sectional view illustrating one example of another die-cast component cast by using the cast-in structure and the cast-in mold according to another embodiment of the present invention.

[Description of Cast-in Structure]

As in the embodiment described above in detail, the cast-in structure closes the gap S between a cast-in member 20 and a later-described cast-in mold A4 by the structure in which butting portions 22 and 23 of the cast-in mold A4 are brought into intimate butting contact with a mold contact portion 21 of the cast-in member 20, when the cast-in mold A4 is clamped. In other words, a cavity a1 of the cast-in mold A4 is closed by the intimate butting-contact of the butting portions 22 and 23 of the cast-in mold A4 to the mold contact portion 21 of the cast-in member 20. This structure prevents burr from projecting toward the bonding portion 20b of the cast-in member 20, which is set to be located outside of the cavity a1 (see FIG. 15(b) described later).

<<Structure of Cast-in Member>>

Figure 14:
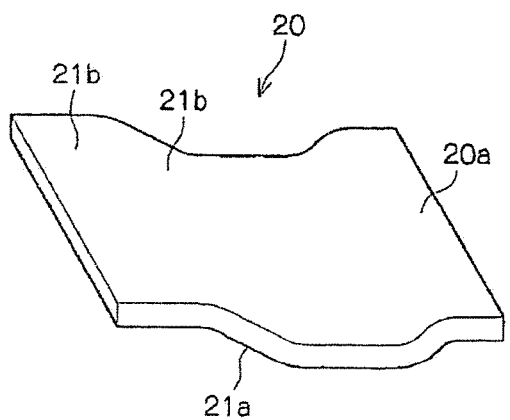
FIG. 14 is a perspective view illustrating one example of a cast-in member wrapped cast and bonded to the die-cast component.

FIG. 14 is a perspective view illustrating one example of the cast-in member bonded to the die-cast component by wrapping cast. The structure will be described with reference to FIG. 13, according to need.

For example, the cast-in member 20 is formed into a sheet shape with a desired size by press-cutting and bending a steel plate with a thickness of about 3 mm as illustrated in FIG. 14. As illustrated in FIG. 13, one side of the cast-in member 20 is defined as a cast-in portion 20a that is wrapped cast upon molding the die-cast component 100, and the other side is defined as a bonding portion 20b bonded to a steel plate bonding member, not illustrated.

As illustrated in FIG. 14, the cast-in member 20 thus configured has a tapered mold contact portion 21 on the boundary between the cast-in portion 20a and the bonding portion 20b.

<<Structure of Mold Contact Portion>>

The mold contact portion 21 includes a fixed mold contact taper surface portion 21a and a movable mold contact taper surface portion 21b. When the cast-in mold A4 is clamped, a butting portion 22 on a fixed mold A5 of the cast-in mold A4 are brought into intimate butting contact with the fixed mold contact taper surface portion 21a, and a butting portion 23 on a movable mold A6 of the cast-in mold A4 is brought into intimate butting contact with the movable mold contact taper surface portion 21b. Specifically, the mold contact portion 21 is brought into intimate butting contact with the butting portions 22 and 23 of the fixed mold A5 and the movable mold A6 from both surfaces. The intimate butting-contact described above is achieved from both surfaces within an intimate-contact range L in FIG. 15 (b).

<<Structure of Cast-in Mold>>

Figure 15:
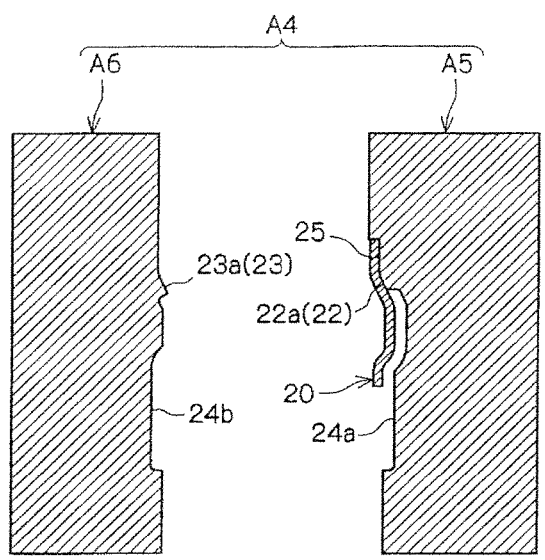
FIG. 15 is an explanatory view illustrating a section of a cast-in mold according to another embodiment of the present invention, wherein (a) illustrates that a cast-in member is carried to a fixed mold, and (b) illustrates a mold clamping state of a movable mold relative to the fixed mold.
Figure 15:
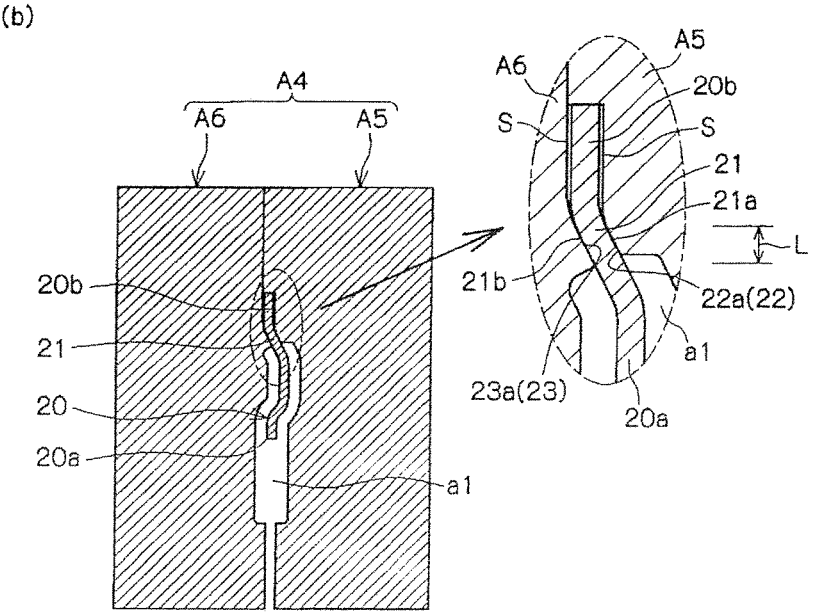

FIG. 15 is an explanatory sectional view illustrating the cast-in mold according to another embodiment of the present invention.

The cast-in mold A4 includes the fixed mold A5 and the movable mold A6 that can perform mold clamping and mold opening relative to the fixed mold A5.

An insert holding portion 25 is provided on a mold parting surface (mating surface) consecutive to a cavity surface 24a of the fixed mold A5, out of cavity surfaces 24a and 24b, forming the cavity a1, of the fixed mold A5 and the movable mold A6. The butting portion 22 is provided on the boundary between the insert holding portion 25 and the cavity surface 24a. The butting portion 23 is provided on a mold parting surface of the movable mold A6 opposite to the butting portion 22.

<<Structure of Butting Portion>>

As illustrated in FIG. 15, the butting portions 22 and 23 are respectively a fixed butting taper surface portion 22a and a movable butting taper surface portion 23a. Each of the fixed butting taper surface portion 22a and the movable butting taper surface portion 23a is formed into a taper shape toward the cavity surface 24a or 24b on each of the fixed mold A5 and the movable mold A6 with a tilt angle of the fixed mold contact taper surface portion 21a and the movable mold contact taper surface portion 21b of the cast-in member 20.

With this structure, when the movable mold A6 is clamped relative to the fixed mold A5, the fixed butting taper surface portion 22a is brought into intimate butting contact with the fixed mold contact taper surface portion 21a of the cast-in member 20, while the movable butting taper surface portion 23a is brought into intimate butting contact with the fixed mold contact taper surface portion 21b of the mold contact portion 21 of the cast-in member 20. Accordingly, the fixed mold A5 and the movable mold A6 hold the cast-in member 20 in the state in which the cast-in member 20 is sandwiched from both surfaces within the intimate-contact range L illustrated in FIG. 15 (b).

Specific examples of the embodiments of the present invention have been described above. However, the embodiments described above in detail are only illustrative, and not intended to limit the scope of the claims. The technical matter described in the claims includes those modified within a scope not departing from the spirit of the present invention.

For example, the cast-in structure of the cast-in member 2 can be configured as described below. Specifically, when the cast-in member 2 is carried to the movable mold A2 by the carrier device B, mold clamping to the fixed mold A1 is performed with the cast-in member 2 being adsorbed and held to the movable mold A2 by magnetic force, and with this state, molten metal is cast. In this case, it is preferable that a magnet is embedded in a portion apart from the cavity a, such as the insert holding portion 8 of the movable mold A2 into which the bonding portion 2b of the cast-in member 2 is inserted. With this structure, the deposition of the molten metal cast in the cavity or deterioration of the magnetic force of the magnet due to thermal influence can be prevented.

Since the cast-in structure for the cast-in member 2 that is adsorbed and held by the movable mold A2 by magnetic force is employed, the following operation can be realized. Specifically, after the cast-in member 2 is carried to the movable mold A2, the mold clamping of the movable mold A2 to the fixed mold A1 is started. Immediately before or after the movable mold A2 is clamped relative to the fixed mold A1, the slidable advancing motion of the movable core A3 is started from the stand-by position (slide retreating limit), and the movable core A3 is moved to the slide forward limit in the cylinder of the cast-in member 2. With this, a series of the mold-clamping operation of the cast-in mold A is completed. Then, the internal butting taper surface portion 11a of the butting portion 11 of the movable core A3 is brought into intimate butting contact with the internal mold contact taper surface portion 4b of the cast-in member 2 at once, whereby the gap S on both surfaces can be closed.

The biting projection 12 may be provided on the butting portion 11 (the internal butting taper surface portion 11a) of the movable core A3. It may be configured such that, when the butting portion 11 is brought into intimate butting contact with the internal mold contact taper surface portion 4b of the mold contact portion 4 of the cast-in member 2, the biting projection 12 bites the internal mold contact taper surface portion 4b, as in the external mold contact taper surface portion 4a of the mold contact portion 4.

Although the detailed description is not made, plastic deformation (plastic strain) of the cast-in member 2 during a manufacture by press molding or machine working can be corrected by the mold clamping for closing the gap S by the structure in which the external butting taper surface portions 9a of the butting portions 9 of the fixed mold A1 and the movable mold A2 and the internal butting taper surface portion 11a of the butting portion 11 of the movable core A3 are brought into intimate butting contact with the internal and external taper surface portions 4a and 4b of the mold contact portion 4 of the cast-in member 2.

For example, in the case where plastic strain is caused such that the long side of the cylindrical wall of the cast-in member 2, which is press-molded into a general rectangular cylinder in a plan view, is curved toward the inside of the cylinder, this plastic strain can be linearly corrected by press-contact from both the inner surface and the outer surface of the cylinder with mold-clamping force (pressing force) from a die-cast machine.

Specifically, the plastic strain remaining on the cylinder wall of the cast-in member 2 after the machining work (pressing) is corrected by the mold clamping force and the taper structure in which the fixed and movable molds A1 and A2 and the movable core A3 are brought into intimate butting contact with the cast-in member 2 upon the mold clamping. Accordingly, it is expected that the cast-in member 2 is returned to the correct cylindrical shape illustrated in the figure, and with this state, bonded to the die-cast component 1 by the casting-in.

The cast-in structure of the cast-in member 2 and the cast-in mold A according to the present embodiment can be applied to an injection molding field in which a steel plate cast-in member is bonded to a resin component by casting-in, as well as a die-cast field in which a steel plate cast-in member is bonded by casting-in upon molding a die-cast component.

REFERENCE SIGNS LIST

A, A0, A4: Cast-in mold
A1, A5: Fixed mold
A2, A6: Movable mold
A3: Movable core
a, a1: Cavity
1, 100: Die-cast component
2: Cast-in member
2a: Cast-in portion
2b: Bonding portion
3: Bonding member
4, 21: Mold contact portion
4a: External mold contact taper surface portion
4b: Internal mold contact taper surface portion
5: Constricted portion
9, 11, 22, 23: Butting portion
9a: External butting taper surface portion
11a: Internal butting taper surface portion
12: Biting projection
S: Gap

The invention claimed is:

1. A method of forming a cast-in structure with a cast-in member, wherein the cast-in member is made of a steel plate having a cast-in portion, a bonding portion to be bonded to a steel plate bonding member, and mold contact portions on both of opposite side surfaces of the cast-in member at a boundary between the cast-in portion and the bonding portion, the method comprising:
   clamping a cast-in mold around the cast-in portion of the cast-in member so that the mold contact portion of the cast-in member is in intimate butting contact with the cast-in mold on both of the opposite side surfaces of the cast-in member;
   molding a die-cast component in the cast-in mold within which the cast-in portion of the cast-in member is wrapped cast with a wrapped casting excluding the bonding portion from the wrapped casting;
wherein the mold contact portion of the cast-in member is formed to have a taper shape;
wherein the cast-in mold has a structure including a fixed mold, a movable mold that can perform mold clamping and mold opening relative to the fixed mold, and a movable core that is assembled to the movable mold so as to be capable of advancing and retreating and forms a cavity with both of the fixed mold and the movable mold; and
   the mold contact portion of the cast-in member is in intimate butting contact with the fixed mold and the movable mold at the outside of the mold contact portion, and the mold contact portion of the cast-in member is intimate butting contact with the movable core at the inside of the mold contact portion.

2. The method according to claim 1, wherein:
the cast-in member is formed into a hollow cylinder;
the mold contact portions comprise internal and external mold contact taper surface portions, formed to have a taper shape in an axial direction of the cylinder and formed around the entire circumference of the cylinder;
the boundary is a boundary between the bonding portion at one end of the cast-in member and the cast-in portion on both inside and outside surfaces at the other end of the cast-in member;
the method further comprising clamping the cast-in mold comprises bringing a tapered butting portion formed on the cast-in mold into intimate butting contact with the internal and external mold contact taper surface portions.

* * * * *